Nov. 3, 1970   A. PFEUFFER   3,537,147
HOSE CLAMP
Filed Oct. 1, 1968   2 Sheets-Sheet 2
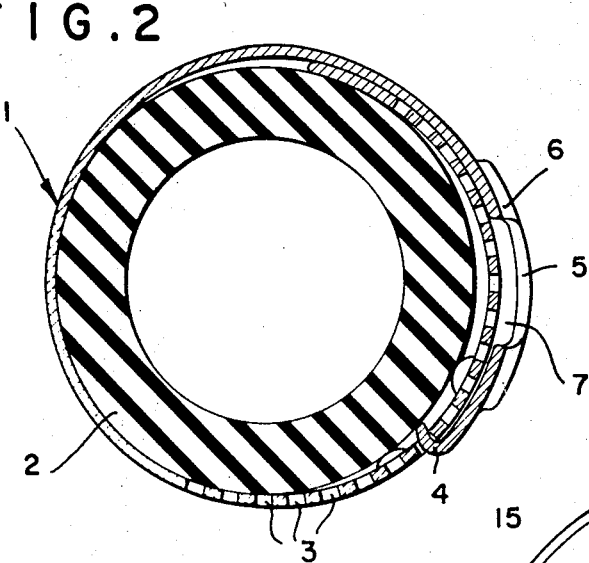
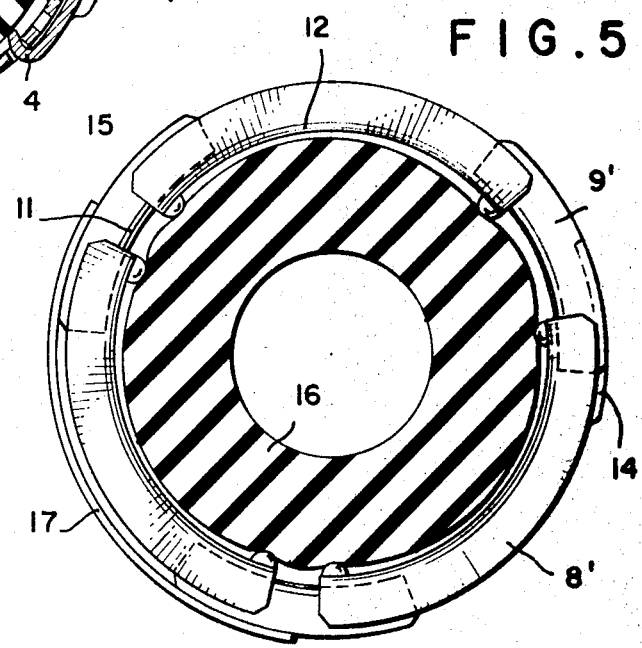
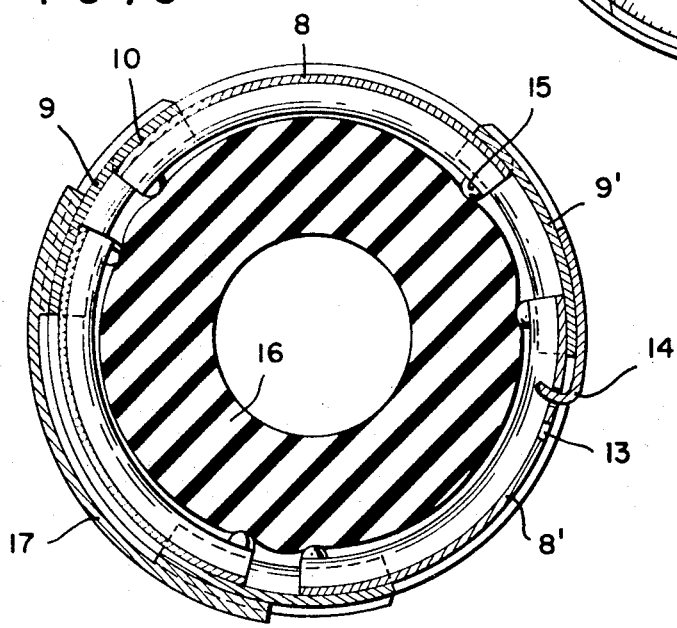
INVENTOR.
ANTON   PFEUFFER
BY
Nolte and Nolte
ATTORNEYS United States Patent Office 3,537,147
Patented Nov. 3, 1970

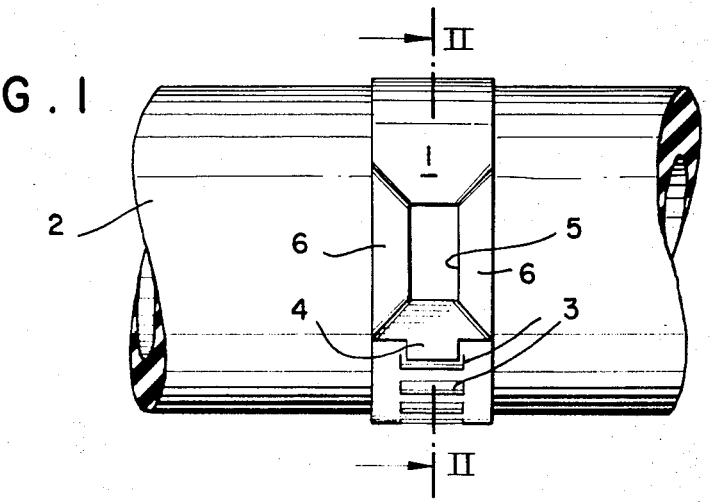
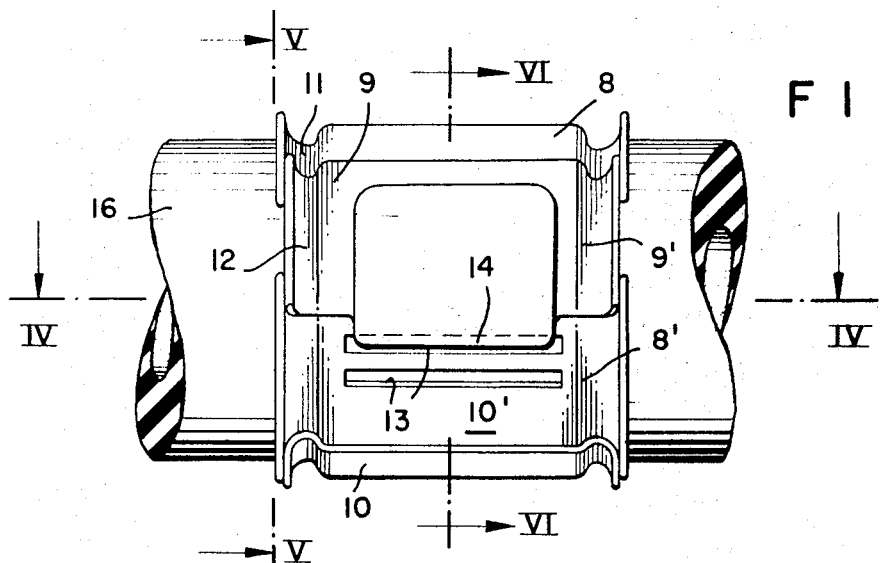
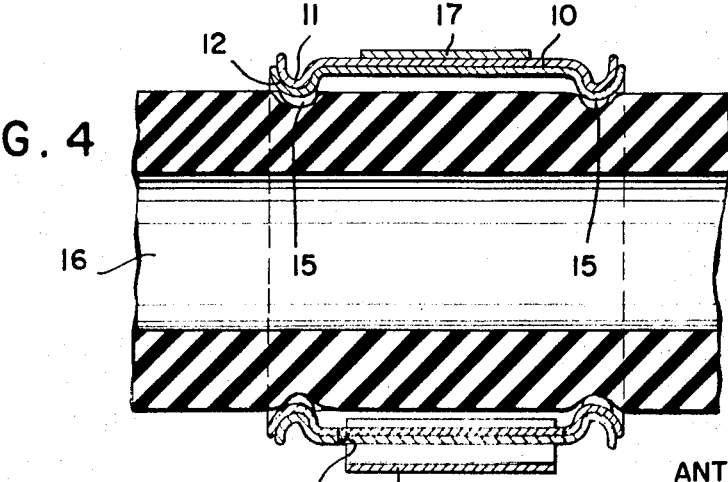

3,537,147
HOSE CLAMP
Anton Pfeuffer, 301 E. 78th St., New York, N.Y. 10021
Continuation-in-part of application Ser. No. 567,662,
July 25, 1966. This application Oct. 1, 1968, Ser.
No. 764,078
Int. Cl. B65d 63/02
U.S. Cl. 24—20                                              4 Claims

ABSTRACT OF THE DISCLOSURE

A hose clamp of great strength and simplicity constituted by a metal strap or band having a series of transverse slots spaced from an end of the strap and an inwardly turned hook integral with or affixed to said end in a position to engage in a selected slot when the clamp is compressed around a hose.

---

This application is a continuation-in-part of application Ser. No. 567,662 filed July 25, 1966 and now abandoned.

The invention relates to hose clamps of the type used to compress a hose against the surface of a cylindrical part such as a metal pipe, normally for the purpose of making a leak-proof joint capable of resisting whatever pressure or other stresses the joint may be expected to encounter. The clamps shown herein may be used in locations where there is very little clearance and where projecting elements cannot be accommodated.

Practical embodiments of the invention are shown in the accompanying drawing wherein:

FIG. 1 represents an elevation of a clamp applied to a section of hose;

FIG. 2 a transverse section on the line II—II of FIG. 1, on a larger scale;

FIG. 3 represents an elevation similar to FIG. 1 of a modified form of clamp;

FIG. 4 represents an axial section on the line IV—IV of FIG. 3;

FIG. 5 represents a section on the line V—V of FIG. 3, and

FIG. 6 represents a section on the line VI—VI of FIG. 3.

Referring to the drawing, the clamp 1 is shown in FIG. 1 as being secured around a reinforced rubber hose 2, normally for the purpose of attaching the hose to a metal pipe or fitting, not shown. The clamp is constituted by a metal strap (e.g., stainless steel) having a series of transverse slots 3 formed across a median zone extending from one end of the strap for a substantial distance toward the other end. Each slot may suitably have a length of about one-third to one-half the width of the strap, and a width greater than the thickness of the strap.

The end of the strap remote from the slots is provided with an integrally formed hook 4 having a width slightly less than the length of the slots. The hook should curve through somewhat more than 90° making an angle of less than 90° with the band to ensure firm engagement with the wall of a slot, and should not extend inward more than three times the thickness of the strap. Adjacent the hook end of the strap there may be formed an opening 5 on each side of which the strap material is offset outwardly from the plane or arc of the remainder of the strap, as shown at 6, the offset portions providing spaces 7 in which a tool such as a screwdriver may be inserted for removal of the clamp.

Prior to use the clamp may be bent to a position in which the ends are either spaced or overlapped. It may be applied to a hose either by slipping it over the end of a hose to be clamped or by snapping it around a hose, the end of which is engaged on a pipe or other fitting. The open clamp is then, preferably, encircled by the strap of a strap wrench or the like with the hook end of the clamp overlapping the slotted area, the wrench being operated to compress the clamp and bring the hook 4 into engagement with the nearest slot at the point of maximum compression. Upon removal of the wrench the hook remains in secure engagement with the wall of the slot.

The clamp shown in FIGS. 3 to 6 is similar to that just described but designed for heavier duty. It is shown as being a band made up of overlapping inner and outer segments, 8 and 9 respectively, welded together in the region of the flat cylindrical land areas 10, and provided with inwardly facing bead portions 11, 12 which are not welded, thus permitting some flexing of the assembly. One of the inner segments 8 constitutes an end of the clamp and is provided with transverse slots 13 extending, in this instance, almost the full width of the land 10. One of the outer segments 9 is formed into, or provided with, an inwardly turned hook 14 having a width slightly less than the length of the slots 13 and being adapted for engagement in said slots.

As an additional means for getting a secure grip on the hose, the clamp may be provided with inwardly projecting lugs 15 which are forced into the surface of the hose as the clamp is tightened. A reinforcing strip 17 may be welded across the space between two of the outer segments 9, if desired.

The heavy duty clamp is applied to a hose 16 in the same manner as the clamp of FIGS. 1 and 2, after having been slipped over the end of the hose to be clamped, or snapped onto the hose if sufficient flexibility is provided.

In each instance it will be observed that the clamps fit snugly around the hose without undesirable projections, so that they can be used in situations where space is limited. Once closed the clamps cannot shake loose, but they can be removed easily by means of a suitable tool such as a screwdriver.

What I claim is:

1. A hose clamp constituted by a metal band adapted to be placed around a hose to be clamped, one end of said band being provided with an inwardly projecting hook, and a portion of said band spaced from said one end being provided with transverse slots adapted to be engaged by said hook, the band comprising a plurality of segments, adjacent segments being arranged in overlapping relation and being secured together in the areas of overlap, the outer surface of said band, when said hook is engaged in one of said slots, being substantially circular and smooth without projections, whereby application of the clamp to a hose may be effected by means of a strap wrench.

2. A hose clamp according to claim 1 in which the segments are disposed alternately inward and outward with respect to each other, the hook being formed on an outer segment at one end of the band and the slots being formed in an inner segment at the other end of the band.

3. A hose clamp according to claim 1 in which the segments are deformed along their lateral edges to form substantially annular beads adapted to engage the hose to be clamped.

4. A hose clamp according to claim 1 which includes radially inwardly projecting lugs adapted to indent the surface of the hose being clamped.

References Cited

UNITED STATES PATENTS

| | | | |
|---|---|---|---|
| 210,560 | 12/1878 | Robertshaw | 24—20 |
| 1,645,963 | 10/1927 | Moore | 24—20 |
| 1,804,725 | 5/1931 | Walker | 24—20 |
| 249,766 | 11/1881 | Hunt | 285—420 XR |
| 971,519 | 10/1910 | Brannen. | |
| 1,472,966 | 11/1923 | Englund. | |
| 1,519,130 | 12/1924 | Gillet | 24—282 |
| 2,283,179 | 5/1942 | Buckingham | 285—420 XR |
| 2,806,724 | 9/1957 | Anspach et al. | 285—420 XR |

FOREIGN PATENTS 630,008   12/1961   Italy.

DONALD A. GRIFFIN, Primary Examiner